(12) United States Patent
Sasagawa et al.

(10) Patent No.: US 11,199,843 B2
(45) Date of Patent: Dec. 14, 2021

(54) VEHICLE CONTROL APPARATUS

(71) Applicant: TOYOTA JIDOSHA KABUSHIKI KAISHA, Toyota (JP)

(72) Inventors: Wataru Sasagawa, Susono (JP); Kazuyuki Fujita, Gotemba (JP); Minami Sato, Ebina (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 127 days.

(21) Appl. No.: 16/574,024

(22) Filed: Sep. 17, 2019

(65) Prior Publication Data
US 2020/0089240 A1   Mar. 19, 2020

(30) Foreign Application Priority Data

Sep. 19, 2018 (JP) .............................. JP2018-174771

(51) Int. Cl.
*G05D 1/02* (2020.01)
*B62D 6/00* (2006.01)

(52) U.S. Cl.
CPC ........... *G05D 1/0214* (2013.01); *B62D 6/001* (2013.01)

(58) Field of Classification Search
CPC .......................... G05D 1/0214; B62D 15/0265
See application file for complete search history.

(56) References Cited

U.S. PATENT DOCUMENTS

| | | |
|---|---|---|
| 2015/0210279 A1 | 7/2015 | Agnew et al. |
| 2016/0107643 A1* | 4/2016 | Mizutani ............... G01S 13/931 |
| | | 701/519 |
| 2016/0231130 A1 | 8/2016 | Akiyama |
| 2017/0028914 A1* | 2/2017 | Kiyokawa .......... B62D 15/0285 |
| 2017/0190331 A1* | 7/2017 | Gupta ....................... G07C 5/02 |
| 2018/0307240 A1* | 10/2018 | Shalev-Shwartz .......................... B60W 30/18163 |
| 2019/0161274 A1* | 5/2019 | Paschall, II .......... B65G 1/0492 |
| 2020/0353918 A1* | 11/2020 | Goto ..................... B60W 50/00 |
| 2021/0046928 A1* | 2/2021 | Ohmura .......... B60W 30/18163 |

FOREIGN PATENT DOCUMENTS

| | | |
|---|---|---|
| JP | 2015077936 A | 4/2015 |
| JP | 2015155295 A | 8/2015 |
| JP | 2017095100 A | 6/2017 |

\* cited by examiner

*Primary Examiner* — Khoi H Tran
*Assistant Examiner* — Tristan J Greiner
(74) *Attorney, Agent, or Firm* — Hunton Andrews Kurth LLP

(57) ABSTRACT

A vehicle control apparatus is provided with: an executor configured to perform an automatic steering control of steering a vehicle so as to go away from an avoidance target object; a determinator configured to determine, during execution of the automatic steering control targeting a first object, whether or not a second object is detected; and a comparator configured to compare a first interval, which is an interval between the vehicle and the first object, with a second interval, which is an interval between the vehicle and the second object. The executor is configured to change the offset amount to an offset amount corresponding to the second object if the second interval is narrower than the first interval, and to maintain the offset amount at an offset amount corresponding to the first object if the second interval is wider than the first interval.

2 Claims, 5 Drawing Sheets

VEHICLE CONTROL APPARATUS

CROSS-REFERENCE TO RELATED APPLICATIONS

This application is based upon and claims the benefit of priority of the prior Japanese Patent Application No. 2018-174771, filed on Sep. 19, 2018, the entire contents of which are incorporated herein by reference.

BACKGROUND

1. Technical Field

Embodiments of the present disclosure relate to a vehicle control apparatus configured to perform a steering control of a vehicle.

2. Description of the Related Art

For this type of apparatus, there is known an apparatus configured to avoid a collision between a vehicle and a pedestrian or the like by performing a steering control that is automatic in a vehicle (hereinafter referred to as an "automatic steering control" as occasion demands). For example, Japanese Patent Application Laid Open No. 2017-095100 (Patent Literature 1) and Japanese Patent Application Laid Open No. 2015-155295 (Patent Literature 2) disclose a technology/technique in which if a pedestrian is detected near a traffic lane of a vehicle, the vehicle decelerates and passes the pedestrian at a distance from the pedestrian while keeping a position of the vehicle in the current traffic lane.

Moreover, Japanese Patent Application Laid Open No. 2015-077936 (Patent Literature 3) discloses a technology/technique of arithmetically operating a travel route for avoiding a plurality of avoidance targets.

Since a detection range of avoidance target objects is limited, it is hardly possible to detect, for example, an avoidance target object that is far from a vehicle, from the beginning. Thus, in some cases, an avoidance target object that is relatively far from the vehicle is detected after the start of an automatic steering control targeting an avoidance target object that is relatively close to the vehicle (hereinafter referred to as a "first control" as occasion demands). In this case, it is considered that an automatic steering control targeting a newly detected avoidance target object (hereinafter referred to as a "second control" as occasion demands) is performed after the end of the first control.

In the aforementioned configuration, however, there is a possibility that the start timing of the second control is delayed, i.e., that the second control cannot be performed in optimum timing. For example, if a lateral position of an avoidance target object on a back side, which is a target of the second control, is closer to the vehicle (i.e., an interval in a lateral direction between this avoidance target object and the vehicle is narrower) than an avoidance target object on a near side is, which is a target of the first control, the first control alone may not be able to provide sufficient avoidance for the back-side avoidance target object. Specifically, an offset amount in the lateral direction required for the automatic steering control (i.e., the interval between the avoidance target object and the vehicle) cannot be realized. Even if the offset amount for the back-side avoidance target object can be realized by the second control, the avoidance for the back-side avoidance target object is not sufficient while the first control is performed. Thus, an occupant of the vehicle may feel anxiety.

SUMMARY

In view of the aforementioned problem, it is therefore an object of embodiments of the present disclosure to provide a vehicle control apparatus configured to perform an automatic steering control for avoiding an avoidance target object.

An aspect of a vehicle control apparatus according to the present disclosure is provided with: an executor configured to perform an automatic steering control so as to avoid a collision between a vehicle and an avoidance target object when the avoidance target object is detected in a predetermined range of the vehicle, wherein the automatic steering control is a control of steering the vehicle so that a vehicle lateral position, which is a position of the vehicle in a lateral direction crossing a direction of travel of the vehicle, is away from a target lateral position, which is a position of the avoidance target object in the lateral direction, by a distance corresponding to an offset amount determined on the basis of the target lateral position; a determinator configured to determine, during execution of the automatic steering control targeting a first object as the avoidance target object, whether or not a second object is detected as the avoidance target object on a far side of the first object, as viewed from the vehicle, in the direction of travel of the vehicle, and on a same side as that of the first object, as viewed from the vehicle, in the lateral direction; and a comparator configured to compare a first interval and a second interval if it is determined that the second object is detected, wherein the first interval is an interval associated with the lateral direction between the vehicle and the first object, and the second interval is an interval associated with the lateral direction between the vehicle and the second object, wherein the executor is configured (i) to change the offset amount to an offset amount determined on the basis of the target lateral position of the second object if the second interval is narrower than the first interval, and (ii) to maintain the offset amount at an offset amount determined on the basis of the target lateral position of the first object if the second interval is wider than the first interval.

DETAILED DESCRIPTION OF THE EMBODIMENT

Hereinafter, a vehicle control apparatus according to an embodiment of the present disclosure will be explained with reference to the drawings.

<Configuration of Apparatus>

Figure 1:
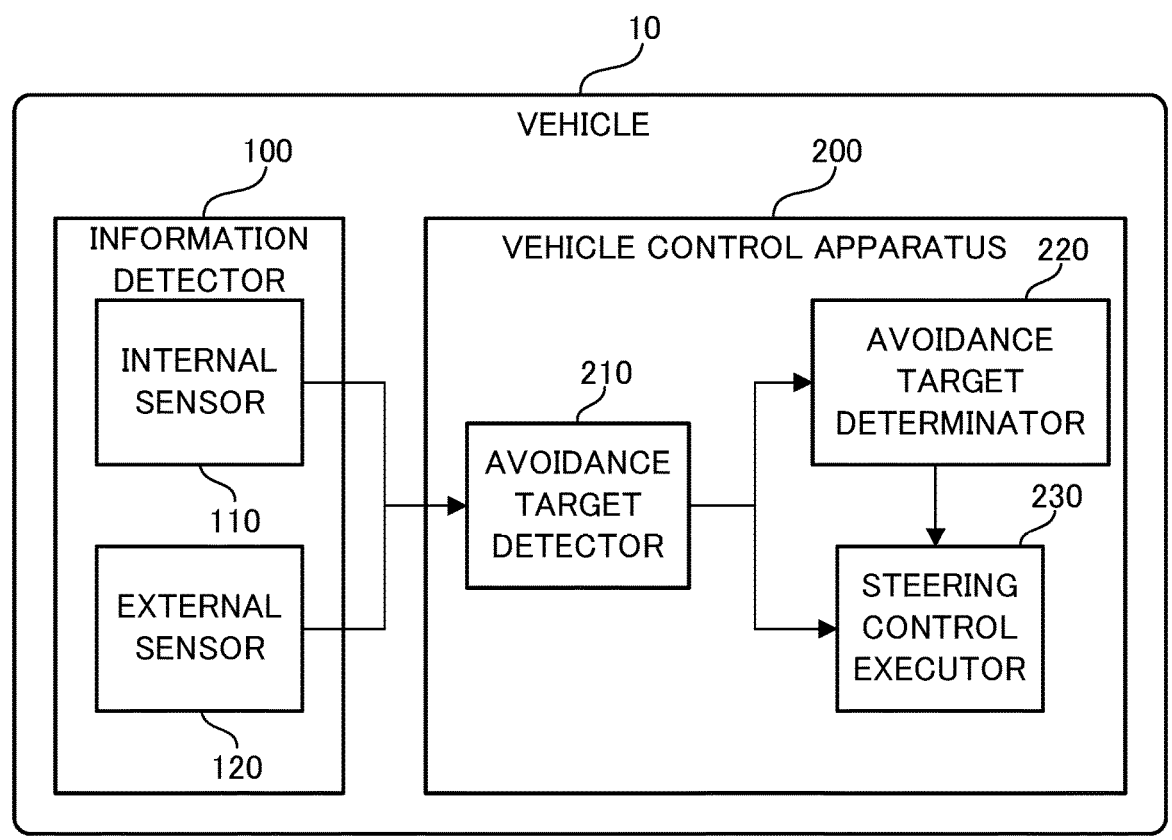
FIG. 1 is a block diagram illustrating a configuration of a vehicle according to an embodiment.

Firstly, a configuration of a vehicle on which the vehicle control apparatus according to the embodiment is mounted will be explained with reference to FIG. 1. FIG. 1 is a block diagram illustrating the configuration of the vehicle according to the embodiment.

As illustrated in FIG. 1, a vehicle 10 according to the embodiment is provided with an information detector 100 and a vehicle control apparatus 200.

The information detector 100 is provided with an internal sensor 110 and an external sensor 120. The internal sensor 110 may include, for example, a vehicle speed sensor, an acceleration sensor, a yaw rate sensor, a steering sensor, or the like, and is configured to detect an internal parameter of the vehicle 10. The external sensor 120 may include, for example, an on-vehicle camera, a radar, a Lidar, or the like, and is configured to detect information about an object (e.g., a pedestrian, etc.) that is in a predetermined range (in other words, in a detectable range of the external sensor 120) near the vehicle 10 and about a risk (e.g., a risk about rushing out from a blind area).

The vehicle control apparatus 200 is configured to perform an automatic steering control (i.e., an automatic steering control regardless of an operation by an occupant) for avoiding a collision between the vehicle 10 and the object that is around the vehicle 10. The vehicle control apparatus 200 is configured, for example, as an electronic control unit (ECU) mounted on the vehicle 10, and is provided with an avoidance target detector 210, an avoidance target determinator 220, and a steering control executor 230, as logical processing blocks or physical processing circuits for realizing its functions.

The avoidance target detector 210 is configured to detect an avoidance target object that is ahead of the vehicle 10 on the basis of the information detected by the information detector 100 (in other words, the internal sensor 110 and the external sensor 120). The "avoidance target object" herein may be an object on which the automatic steering control is to be performed so as to avoid the collision, and may include the risk of the blind area (e.g., a pedestrian who possibly rushes out from the blind area, etc.) in addition to an actually detected object. A detailed explanation of a specific method of detecting the avoidance target object will be omitted herein because the existing technologies/techniques can be applied, as occasion demands.

The avoidance target detector 210 is configured to successively detect one or a plurality of avoidance target objects. In particular, if a new avoidance target object is detected while an avoidance target object is already detected, the avoidance target detector 210 is configured to determine whether or not the newly detected avoidance target object is farther from the already detected avoidance target object, as viewed in a direction of travel of the vehicle 10, and whether or not the newly detected avoidance target is on the same side as the already detected avoidance target object, as viewed in a lateral direction of the vehicle. Information about the avoidance target object detected by the avoidance target detector 210 may be outputted to each of the avoidance target determinator 220 and the steering control executor 230. The avoidance target detector 210 is a specific example of the "determinator" in Supplementary Notes described later.

The avoidance target determinator 220 is configured to calculate an interval (L1 and L2 described later) in a lateral direction between the vehicle 10 and the avoidance target object detected by the avoidance target detector 210. A detailed explanation of a specific method of calculating the interval between the vehicle 10 and the avoidance target object will be omitted herein because the existing technologies/techniques can be applied, as occasion demands.

The avoidance target determinator 220 is further configured to compare an interval for an avoidance target object that is a target of the already performed automatic steering control (hereinafter referred to as a "current object" as occasion demands) with an interval for a newly detected avoidance target object that is far from the current target (hereinafter referred to as a "back-side object" as occasion demands), and to determine which of the intervals is wider (in other words, which is narrower). This determination result may be outputted to the steering control executor 230. The avoidance target determinator 220 is a specific example of the "comparator" in Supplementary Notes described later.

The steering control executor 230 is configured to perform the automatic steering control targeting the avoidance target object detected by the avoidance target detector 210. Specifically, the steering control executor 230 may perform the automatic steering control of the vehicle 10 by controlling a not-illustrated steering actuator. The automatic steering control may be performed so that the interval in the lateral direction between the vehicle 10 and the avoidance target object is a target offset amount. The target offset amount may be set as a value corresponding to an offset amount determined from a target lateral position (i.e., a position in the lateral direction of the avoidance target). Specifically, the target offset amount may be set as a value for realizing an interval that allows the avoidance of a collision with the avoidance target object.

The steering control executor 230 is further configured to change the target offset amount of the automatic steering control on the basis of the determination result of the avoidance target determinator 220 if there are a plurality of avoidance target objects ahead of the vehicle 10 that are detected. A specific processing content of an operation of changing the target offset amount will be described later in detail in Explanation of Operation.

<Technical Problem>

Figure 2:
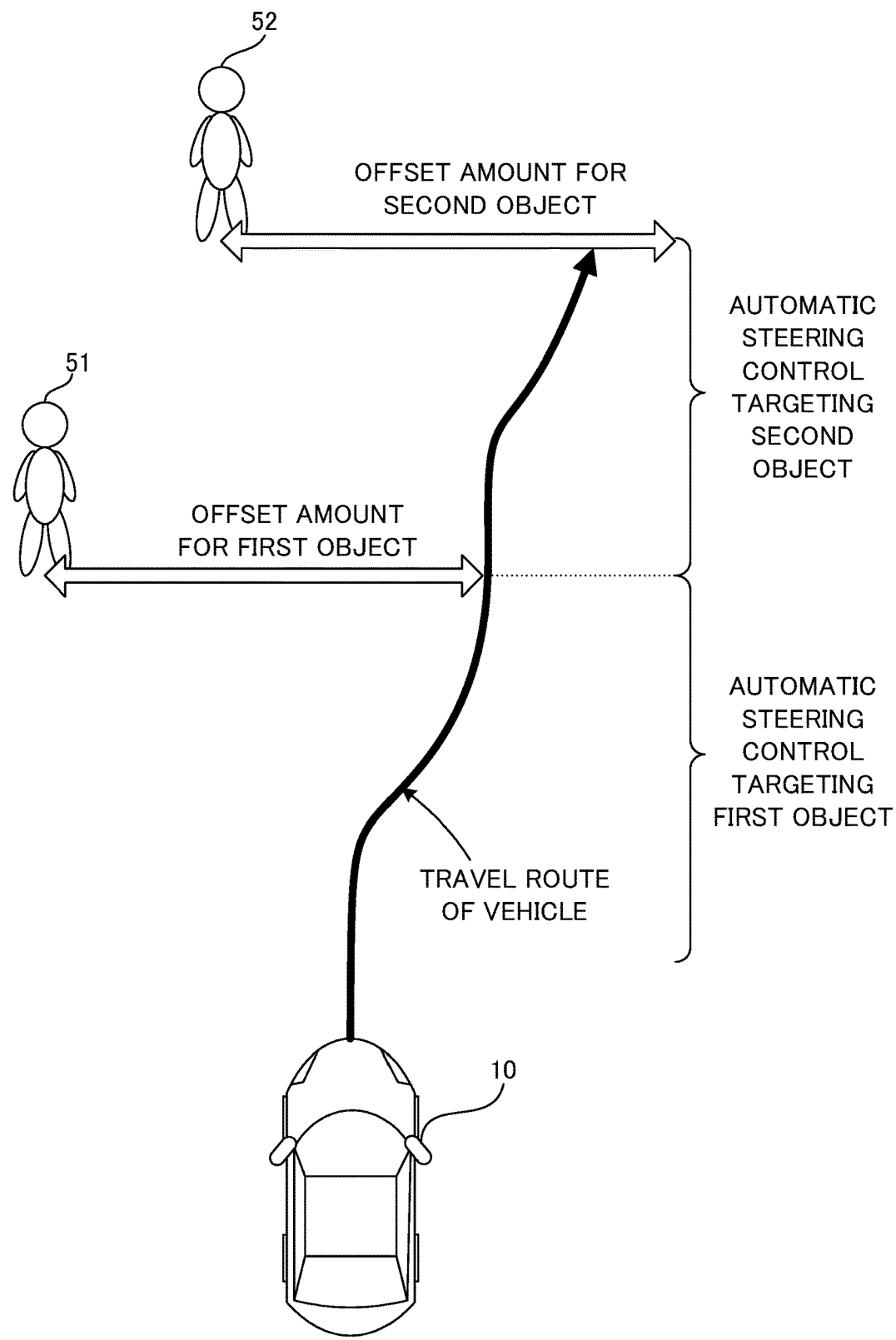
FIG. 2 is a plan view illustrating a technical problem that can occur if there are a plurality of avoidance target objects.

A technical problem that can occur in performing the automatic steering control will be explained with reference to FIG. 2. FIG. 2 is a plan view illustrating a technical problem that can occur if there are a plurality of avoidance target objects.

As illustrated in FIG. 2, it is assumed that there are a first object 51 and a second object 52, which are to be set as the avoidance target object, ahead in the direction of travel of the vehicle. The second object 52 is located on a back side of (i.e., farther in the direction of travel from) the first object 51, as viewed in the direction of travel of the vehicle 10. Moreover, the second object 52 is located on the same side as the first object 51, as viewed in the lateral direction of the vehicle 10, wherein in the example in FIG. 2, both the first object 51 and the second object 52 are on the left side, as viewed from the vehicle 10. The second object 52 is located closer to the vehicle 10 in the lateral direction, than the first target 51 is.

In the aforementioned situation, if the vehicle 10 travels without a change, it is considered that the first object 51 is firstly detected on the near side is detected by the external sensor 120, and then (i.e., after the vehicle travels a little more), the second object 52 on the back side is detected by the external sensor 120. Depending on circumstances, the first object 51 and the second object 52 may be detected substantially at the same time, or the second object 52 on the back side may be detected first. In that case, the problem described later does not occur, and thus, hereinafter, such a case is excluded from the following.

If the first object 51 and the second object 52 are successively detected, the vehicle control apparatus 200 may start the automatic steering control, with the first object 51 on the near side, which is firstly detected, as the avoidance target object. Specifically, as illustrated in FIG. 2, the vehicle 10 is steered so as to take a distance corresponding to the target offset amount for the first object 51 (i.e., so as to go away from the first object 51)

Then, in the example illustrated in FIG. 2, after the end of the automatic steering control targeting the first object 51 (specifically after the vehicle 10 passes the first object 51), the automatic steering control targeting the second object 52 is started. However, if the automatic steering control targeting the second object 52 is performed in this timing and, for example, if the first object 51 and the second object 52 are close in distance in the direction of travel, then, avoiding the second object 52 on the back side may be not performed in time. Moreover, even if it is possible to avoid a collision with the second object 52, the avoidance for the second object 52 is not sufficient (i.e., the offset amount for the second object 52 is not enough) while the automatic steering control for the first object 51 is performed. Thus, the occupant of the vehicle 10 may feel anxiety.

The vehicle control apparatus 200 according to the embodiment is configured to perform operations explained below (specifically, an operation of changing the target offset amount of the automatic steering control depending on circumstances) so as to solve the aforementioned technical problem.

<Explanation of Operation>

Figure 3:
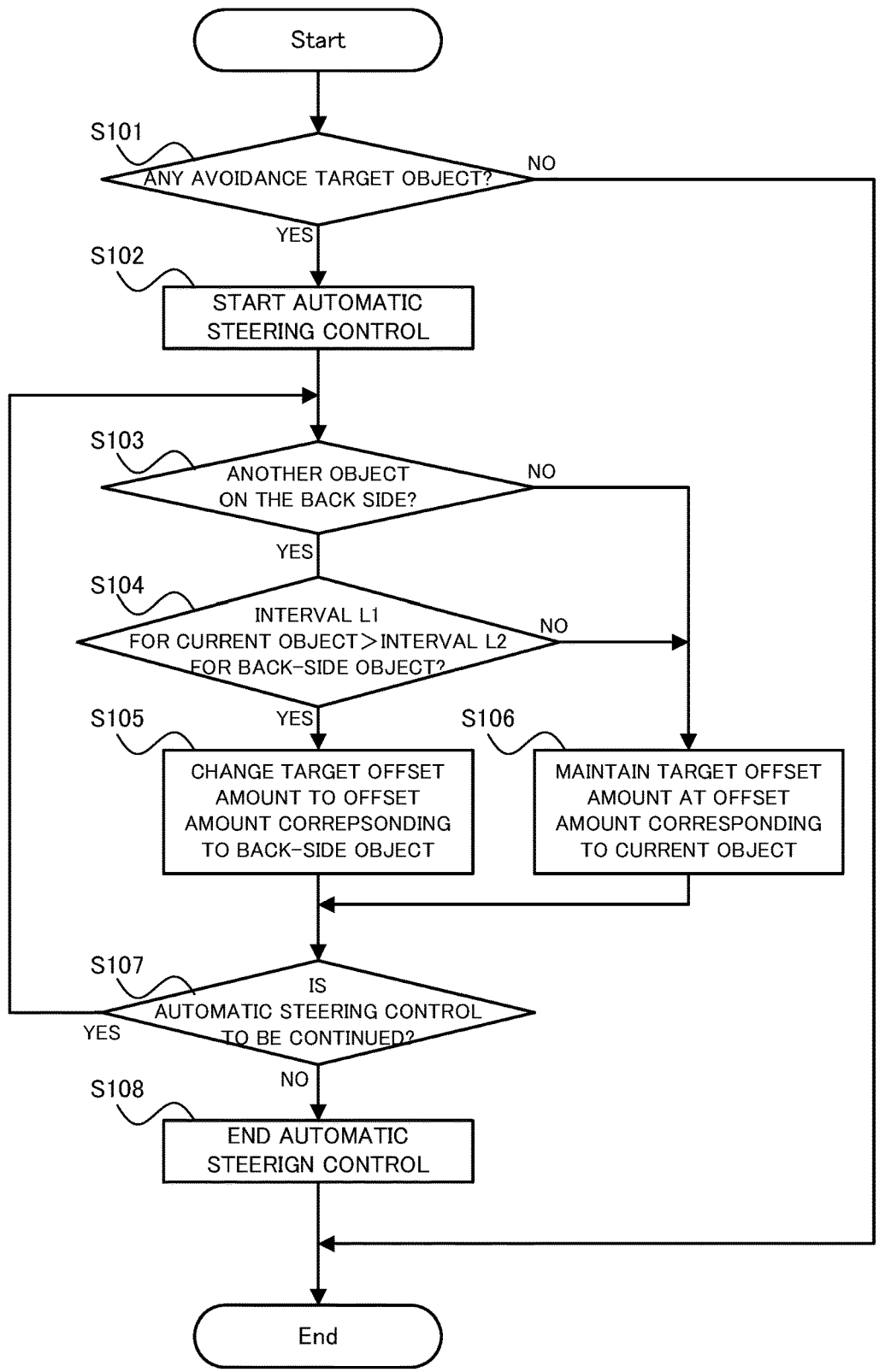
FIG. 3 is a flowchart illustrating a flow of operations of a vehicle control apparatus according to the embodiment.

Next, a flow of operations of the vehicle control apparatus 200 according to the embodiment will be explained with reference to FIG. 3. FIG. 3 is a flowchart illustrating the flow of the operations of the vehicle control apparatus according to the embodiment.

As illustrated in FIG. 3, in operation of the vehicle control apparatus 200 according to the embodiment, firstly, the avoidance target detector 210 determines whether or not there is an avoidance target object ahead of the vehicle 10 (step S101). In other words, the avoidance target detector 210 determines whether or not the avoidance target object is detected on the basis of the information obtained by the information detector 100. If there is no avoidance target object (the step S101: NO), the subsequent process is omitted, and a series of steps is ended. In this case, the e vehicle control apparatus 200 may restart the process from the step S101 after a lapse of a predetermined period.

If there is the avoidance target object (the step S101: YES), the steering control executor 230 starts the automatic steering control targeting the already detected avoidance target object (step S102). In other words, using the target offset amount corresponding to the already detected avoidance target object, such a steering control that the vehicle 10 goes away from the avoidance target object is started.

The avoidance target detector 210 then determines whether or not there is another avoidance target object (i.e., a back-side object) on the back side of the target (i.e., the current object), which is the target of the already performed automatic steering control (step S103). If there is no back-side object (the step S103: NO), the steering control executor 230 continues the automatic steering control while maintaining the target offset amount at a value corresponding to the current object (step S106). On the other hand, if there is the back-side object (the step S103: YES), the avoidance target determinator 220 determines whether or not an interval L2 between the vehicle 10 and the back-side object is narrower than an interval L1 between the vehicle 10 and the current object (step S104).

If the interval L2 is narrower than the interval L1 (the step S104: YES), the steering control executor 230 changes the target offset amount of the automatic steering control to a value corresponding to the back-side object and performs the automatic steering control (step S105). In other words, the target offset amount of the automatic steering control is changed from the offset amount for the current object, which has been used till then, to the offset amount for the back-side object. On the other hand, if the interval L2 is wider than the interval L1 (the step S104: NO), the steering control executor 230 continues the automatic steering control while maintaining the target offset amount at the value corresponding to the current object (the step S106).

The steering control executor 230 then determines whether or not the automatic steering control is to be continued (step S107). In other words, the steering control executor 230 determines whether or not a condition of ending the automatic steering control is satisfied (e.g., whether or not the vehicle 10 has passed the avoidance target object that is the target of the automatic steering control).

If it is determined that the automatic steering control is to be continued (the step S107: YES), the process after the step S103 is performed again. In other words, while the automatic steering control is continued, the detection of the back-side object and the change or maintenance of the target offset amount associated therewith are repeated. In repeating the process after the step S103, if the target offset amount is already changed to the value corresponding to the back-side object, then, the step S103 to the step S106 may be skipped. Alternatively, an avoidance target object located on a further back side (i.e., a new back-side object) may be detected with the back-side object set as a new current object, and the process of changing/maintaining the target offset amount may be performed. If it is determined that the automatic steering control is not to be continued (the step S107: NO), the automatic steering control is ended (step S108), and a series of steps is ended.

<Technical Effect>

Figure 4:
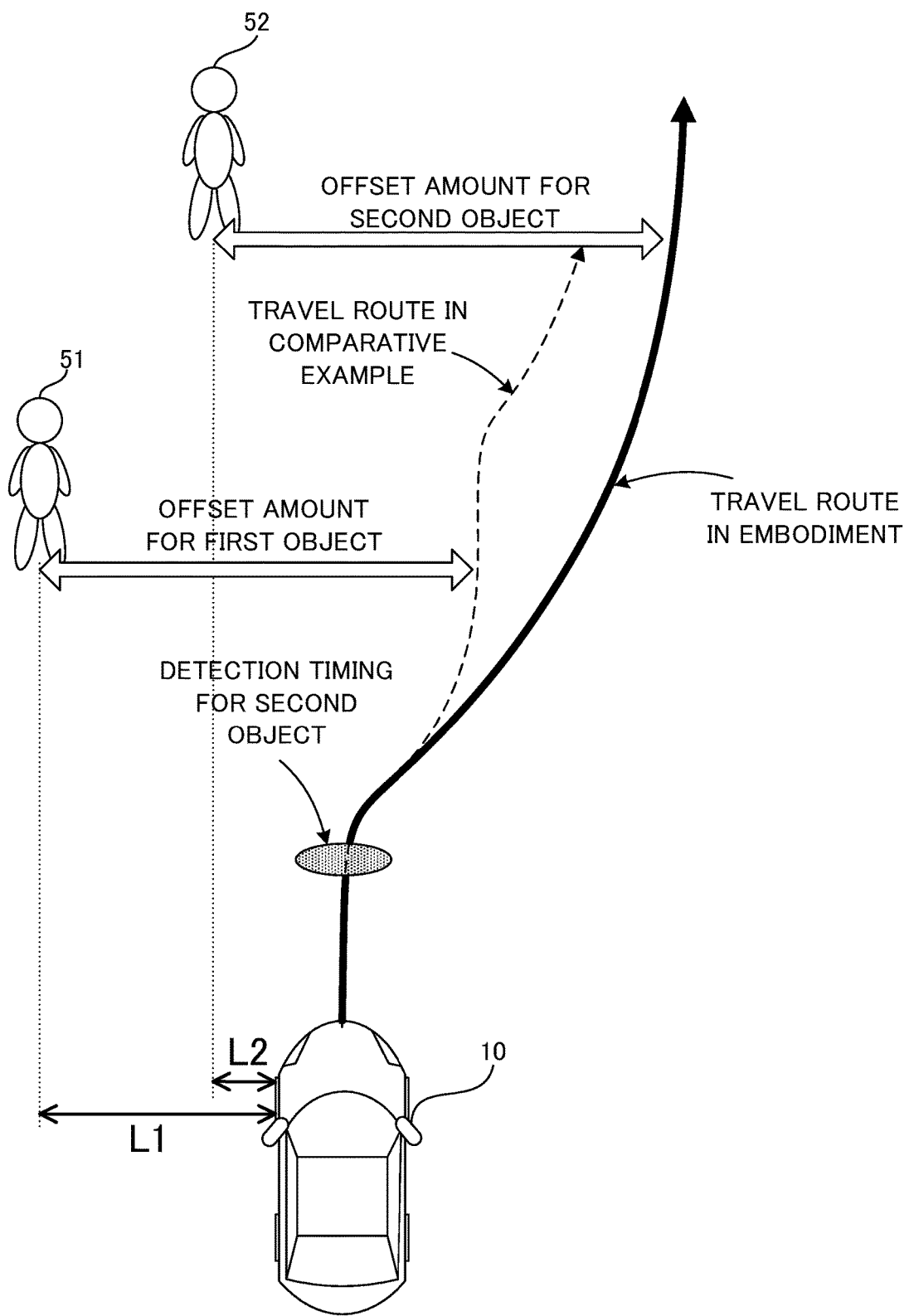
FIG. 4 is a plan view illustrating vehicle behavior when a target offset amount of an automatic steering control is changed.
Figure 5:
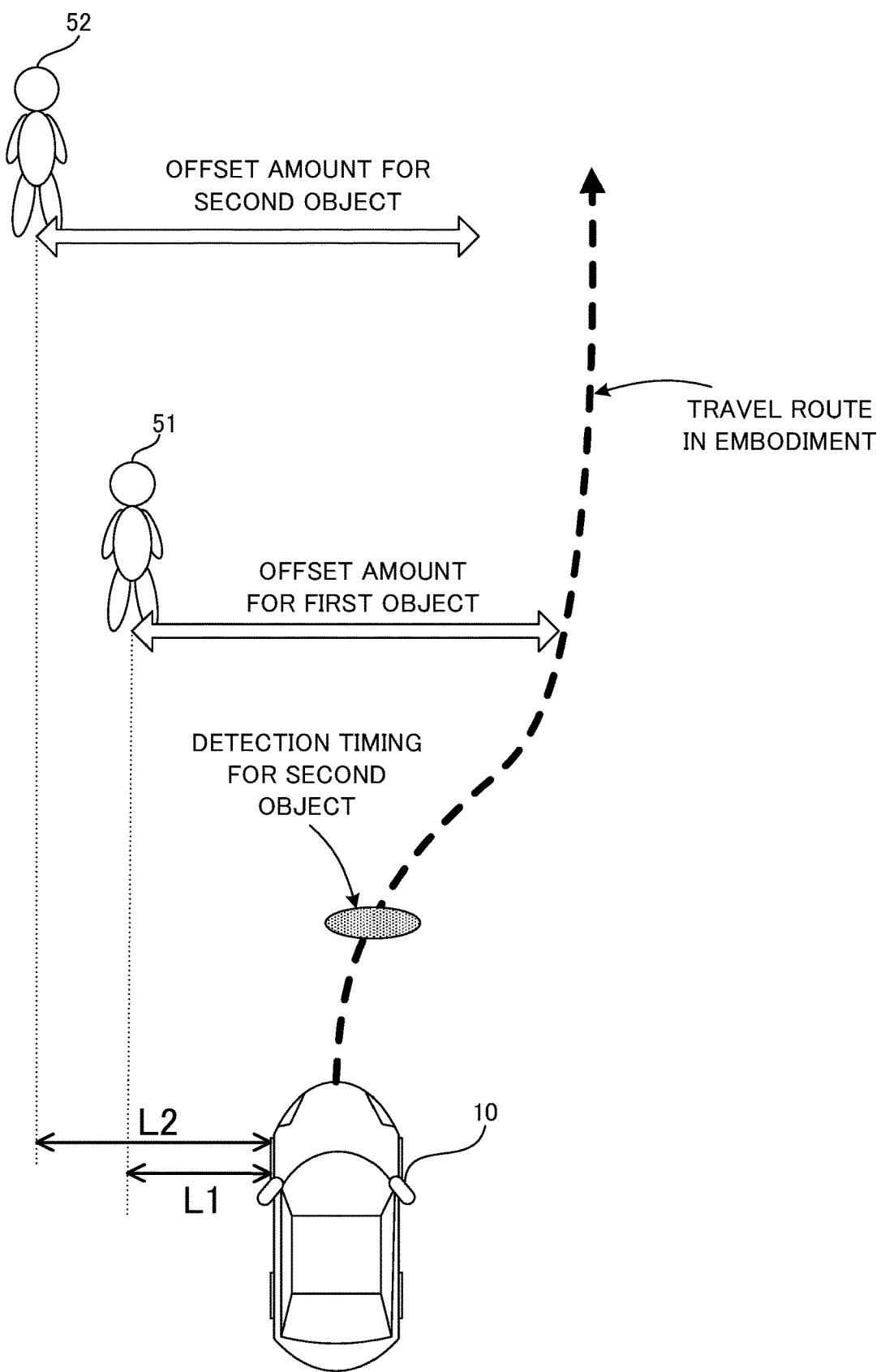
FIG. 5 is a plan view illustrating vehicle behavior when the target offset amount of the automatic steering control is maintained.

Next, a technical effect obtained by the vehicle control apparatus 200 according to the embodiment will be explained with reference to FIG. 4 and FIG. 5. FIG. 4 is a plan view illustrating vehicle behavior when a target offset amount of an automatic steering control is changed. FIG. 5 is a plan view illustrating vehicle behavior when the target offset amount of the automatic steering control is maintained.

As illustrated in FIG. 4, it is assumed that there are the first object 51 (on the near side) and the second object 52 (on the back side) ahead in the direction of travel of the vehicle. In this case, according to the vehicle control apparatus 200 in the embodiment, the offset amount for the first object 51 on the near side is firstly used as the target offset amount to start the automatic steering control, and then, in timing of detecting the second object 52 on the back side (in other words, before ending the automatic steering control targeting the first object 51), the offset amount for the second object 52 is used as the target offset amount to perform the automatic steering control. More specifically, because it is determined that the interval L2 is narrower than the interval L1 as a result of the comparison between the interval L1 for the first object 51, which is the current object, and the interval L2 for the second object 52, which is the back-side object, the target offset amount of the automatic steering control is changed from the value corresponding to the first object 51 to the value corresponding to the second object 52 (refer to the step S105 in FIG. 3).

If the automatic steering control is performed in the above manner, a travel route of the vehicle 10 is changed immediately after the second object 52 is detected (in other words, after the target offset amount of the automatic steering control is changed). As a result, the travel route of the vehicle 10 according to the embodiment is different from a travel route explained in FIG. 2 (refer to a dashed line in FIG. 4). In other words, according to the vehicle control apparatus 200 in the embodiment, the automatic steering control based on the offset amount for the second object 52 is started earlier, in comparison with the comparative example. It is thus possible to realize the automatic steering control including an avoidance operation to be performed on the second object 52, at a relatively early stage.

If the target offset amount of the automatic steering control can be changed in early timing, it is possible to prevent that steering for the second object on the back side is not performed in time. In other words, it is possible to reduce a possibility of collision caused by a delay in steering start timing for avoiding the second object 52. Moreover, the travel route of the vehicle 10 is changed to a route that allows the vehicle 10 to avoid the second object 52 at an early stage. It is thus possible to suppress a sense of anxiety of the occupant of the vehicle 10 (specifically, such a sense of anxiety that the vehicle 10 may collide with the second object 52 if the vehicle 10 continues to travel). As in the example illustrated in FIG. 4, if the second object 52 can be detected at an extremely early stage (specifically, at a time point at which steering by the automatic steering control for the first object 51 is not substantially performed), the number of times of changing the travel route of the vehicle 10 can be substantially reduced. It is thus possible to reduce the meandering of the vehicle 10.

On the other hand, as illustrated in FIG. 5, if the interval L2 is wider than the interval L1, the target offset amount of the automatic steering control is maintained at the value corresponding to the first object 51 (refer to the step S106 in FIG. 3). That is because, in the situation of L1<L2, the adverse effect explained in FIG. 2 can be avoided even by using the offset amount for the first object 51, which is located on the side close to the vehicle in the lateral direction, as the target offset amount to perform the automatic steering control. That is also because, in the situation of L1<L2, if the target offset amount of the automatic steering control is changed to the value corresponding to the second object 52 in the middle of the control, the vehicle 10 may end up traveling so as to approach the first object 51 and the second object 52 and this may make the occupant feel anxiety.

In the example illustrated in FIG. 5, even after the vehicle 10 passes the first object 51 (in other words, even after the automatic steering control targeting the first object 51 is ended), the target offset amount is maintained as the value corresponding to the first object 51. This is because the vehicle 10 is prevented from being steered so as to approach the second object 52 by performing the automatic steering control based on the target offset amount corresponding to the second object 52 after the end of the automatic steering control targeting the first object 51. As described above, if the target offset amount corresponding to the first object 51 is maintained even after the vehicle 10 passes the first object 51, it is possible to suppress the sense of anxiety of the occupant of the vehicle 10 (specifically, such a sense of anxiety that the vehicle 10 may approach and collide with the second object 52). If there is an adverse effect caused by that the vehicle 10 maintains the target offset amount corresponding to the first object 51 (e.g., the possibility of collision with an oncoming vehicle may increase because the vehicle 10 keeps traveling out of a traffic lane, etc.), then, the automatic steering control corresponding to the target offset amount corresponding to the second object 52 may be performed after the first object 51 is passed (in other words, the vehicle 10 may be steered so as to approach the second object 52 in a range that allows the collision with the second object 52 to be avoided).

<Supplementary Notes>

Various aspects of embodiments of the present disclosure derived from the embodiment explained above will be explained hereinafter.

(Supplementary Note 1)

A vehicle control apparatus described in Supplementary Note 1 is provided with: an executor configured to perform an automatic steering control so as to avoid a collision between a vehicle and an avoidance target object when the avoidance target object is detected in a predetermined range of the vehicle, wherein the automatic steering control is a control of steering the vehicle so that a vehicle lateral position, which is a position of the vehicle in a lateral direction crossing a direction of travel of the vehicle, is away from a target lateral position, which is a position of the avoidance target object in the lateral direction, by a distance corresponding to an offset amount determined on the basis of the target lateral position; a determinator configured to determine, during execution of the automatic steering control targeting a first object as the avoidance target object, whether or not a second object is detected as the avoidance target object on a far side of the first object, as viewed from the vehicle, in the direction of travel of the vehicle, and on a same side as that of the first object, as viewed from the vehicle, in the lateral direction; and a comparator configured to compare a first interval and a second interval if it is determined that the second object is detected, wherein the first interval is an interval associated with the lateral direction between the vehicle and the first object, and the second interval is an interval associated with the lateral direction between the vehicle and the second object, wherein the executor is configured (i) to change the offset amount to an offset amount determined on the basis of the target lateral position of the second object if the second interval is narrower than the first interval, and (ii) to maintain the offset amount at an offset amount determined on the basis of the target lateral position of the first object if the second interval is wider than the first interval.

According to the vehicle control apparatus described in Supplementary Note 1, the target offset amount of the automatic steering control can be changed from the value corresponding to the first object (i.e., the target on the near side) to the value corresponding to the second object (i.e., the object on the back side) in early timing. It is thus possible to prevent the adverse effect caused by a delay in the start of the automatic steering control for avoiding the second object. Specifically, the automatic steering control that also allows the second object to be avoided is performed at an early stage, by which it is possible to prevent that the steering for avoiding the second object is not performed in time. It is also possible to reduce such a sense of anxiety of the occupant that the vehicle may collide with the second object. On the other hand, if the target offset amount is not to be changed, the target offset amount is maintained at the value corresponding to the first object. It is thus possible to prevent an unnecessary steering control from being performed.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A vehicle control apparatus comprising an electronic control unit (ECU) mounted on a vehicle, the ECU is configured to:

perform an automatic steering control so as to avoid a collision between a vehicle and an avoidance target object when the avoidance target object is detected in a predetermined range of the vehicle, wherein the automatic steering control is a control of steering the vehicle so that a vehicle lateral position is away from a target lateral position by a distance corresponding to an offset amount determined on the basis of the target lateral position, wherein the vehicle lateral position is a position of the vehicle in a lateral direction crossing a direction of travel of the vehicle, and the target lateral position is a position of the avoidance target object in the lateral direction;

determine, during execution of the automatic steering control targeting a first object as the avoidance target object, whether or not a second object is detected as the avoidance target object on a far side from the first object when viewed from the vehicle in the direction of travel of the vehicle and on a same side as the first object when viewed from the vehicle in the lateral direction;

compare a first interval and a second interval if it is determined that the second object is detected, wherein the first interval is an interval between the vehicle and the first object in the lateral direction, and the second interval is an interval between the vehicle and the second object in the lateral direction; and (i) to change the offset amount to an offset amount determined on the basis of the target lateral position of the second object if the second interval is narrower than the first interval, and (ii) to maintain the offset amount at an offset amount determined on the basis of the target lateral position of the first object if the second interval is wider than the first interval.

2. The vehicle control apparatus according to claim 1, wherein the target offset amount is set as a value for realizing an interval that allows the avoidance of a collision of the vehicle with the avoidance target object.

* * * * *